Oct. 1, 1968  W. A. LAWSON, JR., ET AL  3,403,831
FILM DRIVE UNIT
Filed April 21, 1966
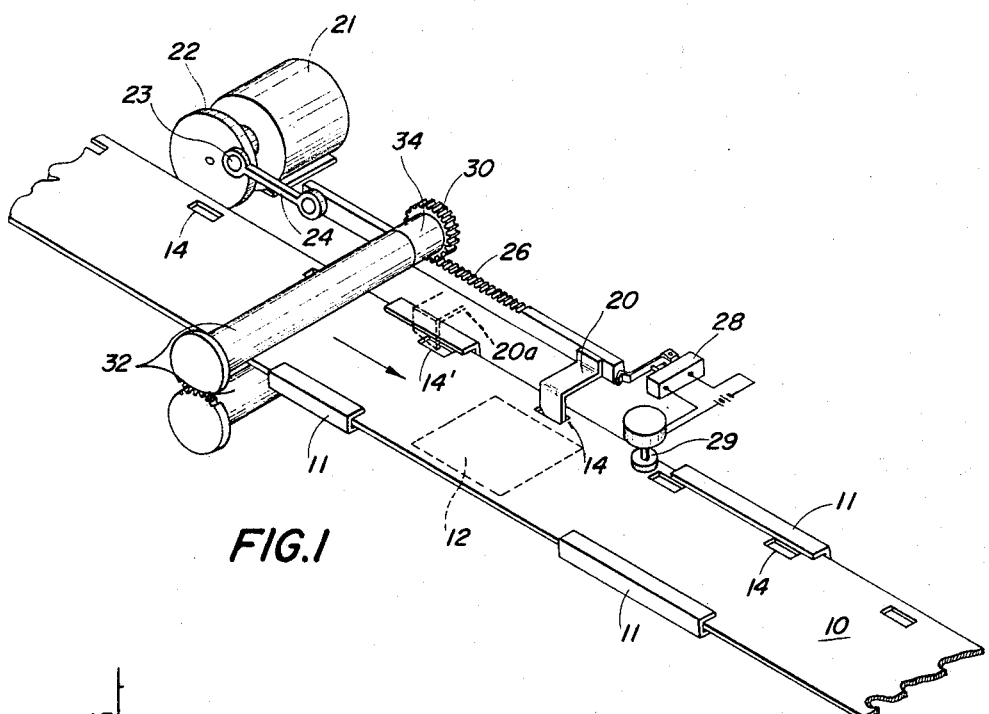
FIG.1
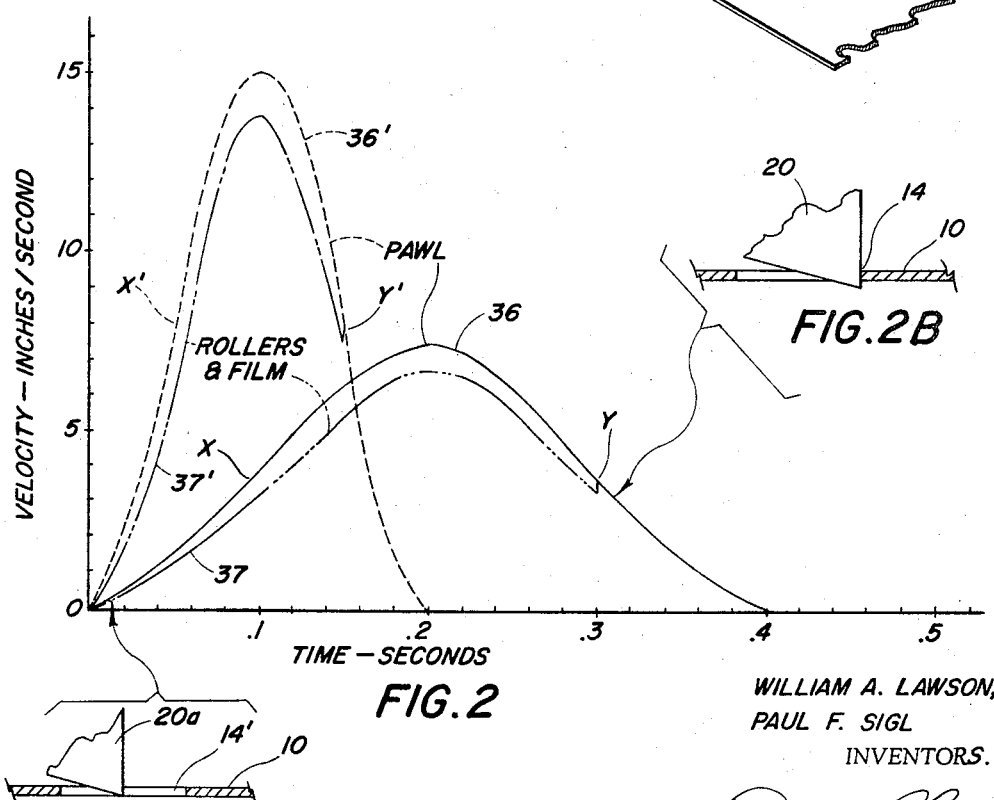
FIG.2
FIG.2A
FIG.2B
WILLIAM A. LAWSON, JR.
PAUL F. SIGL
INVENTORS.
BY Paul P. Holmes
David P. Ogden
ATTORNEYS United States Patent Office 3,403,831
Patented Oct. 1, 1968

3,403,831
FILM DRIVE UNIT
William A. Lawson, Jr., and Paul F. Sigl, Rochester, N.Y., assignors to Eastman Kodak Company, Rochester, N.Y., a corporation of New Jersey
Filed Apr. 21, 1966, Ser. No. 544,249
5 Claims. (Cl. 226—62)

ABSTRACT OF THE DISCLOSURE

A high speed intermittent drive unit for advancing film which comprises a pair of rollers for driving the film through the nip therebetween and accelerating the film to a predetermined velocity whereupon a pawl coordinated with the roller movement engages a film aperture to assist in driving the film and to establish the final position of the film. Damage to the aperture edges as a result of high acceleration forces is thereby reduced.

The present invention relates to a film drive unit and more particularly to a high speed intermittent movement drive unit able to overcome substantial film inertia without damaging sprocket holes of the film.

Many intermittent drive mechanisms are well known. One popular system includes a low inertia loop wherein a portion only of the loop is cyclically driven laterally by means of a pawl. Although such low inertia pawl drive systems are rapid and accurate, they are not most satisfactory in all high speed film drive applications. Moreover, the use of a pawl drive for attaining a specific location of a film having apertures is of economic value only if the pawl does not damage the apertures of the film. Any such damage causes inaccuracies of film placement. At increased speeds of film advancement, the film damage problem is particularly acute, especially in film advance arrangements where it is most suitable to advance a substantial mass of film in a straight line without the formation of a low inertial loop.

Therefore, an object of the present invention is to provide an improved, high speed film advance mechanism which will not damage film apertures.

In accordance with one embodiment of the present invention, a pair of drive rollers are energized to initiate straight line advancement of a length of film. As the film advances, a pawl, coupled to move concurrently with the drive rollers and to advance more rapidly than the film, overtakes a positioning aperture of the film near the termination of the advancement cycle. Thus, the pawl accurately establishes the final position of the film without imparting a major portion of the advancement energy thereto, whereby the aperture drive surface is not overstressed and deformed.

The subject matter which is regarded as my invention is particularly pointed out and distinctly claimed in the concluding portion of this specification. The invention, however, as to its organization and operation, together with further objects and advantages, will best be understood by reference to the following description taken in connection with the accompanying drawing, in which:

FIG. 1 is a perspective view of a simplified film drive mechanism utilizing the present invention; and FIGS. 2, 2A and 2B show a graphic presentation and fragmentary views illustrating the velocity, time and distance relationships between the rollers, pawl and film shown in FIG. 1.

Referring now to the drawing, a film 10 is driven frame by frame through guide devices 11 past a framing aperture in a camera or projector and indicated in dashed lines at 12. One such framing aperture is well known in projectors and photographic projection printers. When a developed film is at rest, light is projected through the aperture 12 to obtain useful signal information.

Also the aperture 12 is usually movable slightly relative to the film positioning means so as to adjust it according to an image on the film. Once the aperture 12 is so adjusted, several successive frames may be viewed without further adjustment. One presently popular type of film 10 is provided with one aperture 14 per frame with this aperture being precisely located relative to the leading and trailing edges of the film image. Thus, by precisely positioning the aperture 14, the film image may be properly located in the framing aperture 12. When using such a film, even if several such films are secured together to form a long strip, no interim adjustment of the aperture 12 is necessary.

In order to better appreciate the significance of the present invention, it is helpful to understand recent evolution in its field. One of the most significant technological advances in the photographic industry is the ability of newer printers and projection printing systems in particular, to expose individual frames at a much more rapid rate than was previously thought feasible. In these systems, a slow speed advance of the film to the framing aperture becomes an economically significant portion of the projection cycle time. A somewhat analogous problem is present in motion picture projectors where maximum illumination periods are desired, particularly in very high speed projection systems. Therefore, it is particularly advantageous to have the film advance as rapidly as possible (without damage thereto) between the utilization portions of the information retrieval operation. Even with a more rapid film advance, it is necessary to have the film stop reliably at a precise location without time consuming operator inspection or adjustment.

For the purpose of precision placement of the film, a pawl 20 is provided. This pawl 20 is driven through each film advancing cycle by a single revolution motor 21. The illustrated pawl motion is in a sinusoidal fashion developed by a wheel 22 having an off-center drive pin 23 coupled to a drive rod 24 which is coupled to the support shaft 26 of the pawl 20. During each cycle, the pawl advances from a rearward position in an aperture 14' (as indicated in dashed lines 20a) to the precise location shown in solid lines at 20, whereby the film frame image is properly positioned over the framing aperture 12.

At its fully advanced position, the pawl 20 or a portion of its support shaft 26 engages a switch 28 to energize a clamping device 29 and prevent "bounce back" of the film when the pawl 20 returns to the standby or ready position. The clamping device 29 may also be used to stabilize the film during projection of an image through the aperture 12. When in standby position, the motor 21 is de-energized until a next signal for a film advance is received. It is clear in FIG. 1 that the top surface of the drive shaft 26 is in the form of a rack positioned to drive a pinion gear 30. The gear 30 is drivingly coupled to a pair of drive rollers 32 by a unidirectional clutch 34 of a type well known in the art. Thus, the rollers 32 are driven to cause the film 10 to accelerate prior to the film being driven by the pawl 20a. The rack and pinion gear ratio is such that after a portion of the film advance is completed, the pawl 20 overtakes and engages the drive surface of the aperture 14.

Referring now to FIG. 2, the velocity and distance relationship of the critical parts are depicted in graphical form. In FIG. 2 the axis of the abscissa shows a time scale in seconds and the scale of the axis of ordinants is velocity in inches per second. It is apparent from the construction shown in FIG. 1 that, if the motor 21 is driven at a uniform velocity, the rollers 32 and pawl 20 velocities both assume a sinusoidal characteristic as depicted in FIG. 2. Thus, the pawl 20 starts initially at 0 velocity. As the wheel 22 rotates the velocity of the pawl 20 moves to a maximum magnitude in about .2 second (at about 90° rotation) and back to 0 at about .4 second (at 180° rotation). It is, of course, impossible to start and stop a motor instantly, but this fact will simply result in the curves being a little flatter at their extremities. This phenomena will not materially change the theory of the following discussion. We, of course, appreciate that pneumatic piston drives may be used with the present invention. If such are used, it is preferred that they be designed to have a soft stop characteristic (asymptotic as shown in FIG. 2) so that the inertia of the film 10 will not carry the aperture drive surface (being utilized to position the film) beyond the extreme forward position of the pawl 20.

According to the present invention, the rack and pinion are selected so that the drive roller surfaces move at a slightly lower velocity than the pawl 20. One velocity differential that works satisfactorily is of the order of 10% as indicated by the location of the "pawl" curves 36 and 36' being above the "rollers and film" curves 37 and 37' respectively. Since both drives operate during identical time periods, the total movement will correspond as indicated by the areas under the curves 36 and 37. Thus, if it is necessary to drive the film 10 frame by frame three inches forward, the rollers 32 will rotate during a single stroke to drive the film a minimum distance of slightly less than three inches, such as 2.95 inches. The pawl 20, which drives the film only the last portion of its advance cycle, will move more than three inches, having backed off to a position 20a (see FIG. 2A) behind the aperture 14' drive surface and will travel a distance such as 3.25 inches. Such an overdrive provides tolerance so that several films may be secured together with spacings other than 3 inches between image frames (and apertures 14) so long as the spacing between apertures at the joint between films remains between 2.95 and 3.25 inches. During the return stroke of the pawl and rack, the gear 30 does not drive the drive rollers 32 because of the unidirectional coupling 34 and the film 10 is prevented from moving backward by the clamp 29.

In order to better understand the operation of the present invention, consider what would happen if the rollers 32 were not energized and no other changes were made in the system described above. When the pawl 20 was energized, it would engage the drive surface of the film aperture 14 at a point such as X and at a velocity (4 inches/second) as great as 50% of the pawls maximum velocity. This is because the distance necessary to catch up with the aperture 14a is usually about 0.26 inch as indicated by the area under the pawl curve 36 between 0 and the point X. Such a velocity, 50% of maximum, tends to severely limit the maximum speed of a film drive unit because of film deformation problems. However, in the present system, the rollers 32 advance the film 10 through a major portion of the drive cycle with the pawl 20 drivingly engaging the film only at a point such as point Y. The velocity differential at the instant of pawl-aperture impact (see FIG. 2B) is only caused by about 5% of maximum pawl velocity compared to about 50% in the prior pawl drives system. The total distance the film is moved is again 3 inches, as indicated by the area under the "rollers and film" curve from 0 to 0 velocity. However, the pawl 20 drives the film only about the last .26 inch and only during a decreasing velocity period. The rollers 32 accomplish all film speed increases and the major portion of the film drive distance. Moreover, when the pawl drives the film as when no rollers are used by itself, it engages the film in a quiescent state whereby it must initially start the film and accelerate it at a relatively high rate.

Assume that a particular film 10 is capable of standing abrupt changes in velocity indicated at point X as a maximum strain (the distance of X above zero). In such a case, it is obviously impossible to increase substantially the velocity of the drive system without damaging the apertures 14. However, economics dictate that the speed of the drive system be increased an amount such as by doubling the advance speed and halving the advance time. Such a change is indicated in dashed lines of FIG. 2 wherein point X' indicates a velocity twice as great as that shown at X. Although the velocity difference is twice as great at Y' as it is at Y (see FIG. 2 the distance between curves 36 and 37 or 36' and 37'), obviously the magnitude is substantially less than that shown in X or X'. Therefore, it becomes clear that the drive system of the present invention may advance the film at many times the velocity that the film could be advanced by the pawl 20 alone.

When the total overdrive of the pawl 20 (see 20a) can be reduced to 5% of the total film advance, the velocity of the system may be increased to 20 times that of the simple pawl drive instead of ten times as indicated in the curves of FIG. 2. Moreover, because the film is decelerating when the pawl 20 engages it, it is practicable to increase the speed of film advance even more than is indicated by the curves of FIG. 2. Thus, it becomes obvious that the film advance time may be reduced to a very few percent the time necessary for previous film advances without damage to the position apertures 14.

While we have shown a particular embodiment of this invention, modifications thereof will occur to those skilled in this art. For instance, the film, as used herein, might be a photographic projector type as indicated, or could be practically any type of continuous web able to receive or impart signal information from specified areas or frames and having an aperture-like drive surface. We intend, therefore, to have the appended claims cover such embodiments as properly fall within the scope of the present invention.

We claim:

1. A drive unit for advancing along a predetermined path film having a plurality of longitudinally aligned apertures, said drive unit comprising:
    a film advance pawl for advancing the film upon engagement with an aperture;
    film advance means for engaging a transverse portion of the surface of at least one side of the film to accelerate the film independently of said pawl; and
    means operatively associated with said pawl and said film advance means for driving the film advance means to accelerate the engaged film to a predetermined velocity and for driving said pawl into engagement with the aperture when said velocity is reached to further advance and locate the film.

2. A film drive unit as in claim 1 wherein said film advance means includes a pair of drive rollers that engage a substantial width of the film and said pair of drive rollers is coupled to said drive means by a unidirectional clutch.

3. A drive unit as in claim 1 wherein clamp means are provided to prevent retraction of the film during a return stroke of said pawl.

4. The invention according to claim 1 comprising:
means for regulating the velocity of the pawl relative to the film advance means to maintain a velocity differential between the pawl and the film of no more than about 10% of the pawl velocity.

5. The invention according to claim 1 and wherein said driving means includes means for disengaging the pawl from the engaged aperture and for positioning the pawl for engagement with another of said aligned apertures.

References Cited

UNITED STATES PATENTS

| | | | |
|---|---|---|---|
| 1,317,502 | 9/1919 | Janot | 352—192 X |
| 3,049,275 | 8/1962 | Nuttall | 226—63 |

M. HENSON WOOD JR., *Primary Examiner.*

R. A. SCHACHER, *Assistant Examiner.*